United States Patent
Kopmeiners et al.

(10) Patent No.: US 7,885,177 B2
(45) Date of Patent: Feb. 8, 2011

(54) METHODS AND APPARATUS FOR BACKWARDS COMPATIBLE COMMUNICATION IN A MULTIPLE ANTENNA COMMUNICATION SYSTEM USING TIME ORTHOGONAL SYMBOLS

(75) Inventors: Robert John Kopmeiners, Hengelo (NL); Tim Schenk, Eindhoven (NL); Allert Van Zelst, Woerden (NL)

(73) Assignee: Agere Systems Inc., Allentown, PA (US)

( * ) Notice: Subject to any disclaimer, the term of this patent is extended or adjusted under 35 U.S.C. 154(b) by 129 days.

(21) Appl. No.: 10/562,620

(22) PCT Filed: Jun. 30, 2004

(86) PCT No.: PCT/US2004/021028
§ 371 (c)(1),
(2), (4) Date: May 26, 2006

(87) PCT Pub. No.: WO2005/006700
PCT Pub. Date: Jan. 20, 2005

(65) Prior Publication Data
US 2006/0251193 A1 Nov. 9, 2006

Related U.S. Application Data

(60) Provisional application No. 60/483,719, filed on Jun. 30, 2003, provisional application No. 60/528,169, filed on Dec. 9, 2003.

(51) Int. Cl.
*H04J 11/00* (2006.01)
*H04B 7/02* (2006.01)
(52) U.S. Cl. ................. 370/208; 375/267; 455/101
(58) Field of Classification Search .......... 370/206–210, 370/329–330, 343, 344, 334; 455/401, 101, 455/112; 375/375, 260–267, 299
See application file for complete search history.

(56) References Cited

U.S. PATENT DOCUMENTS 6,473,506 B1 * 10/2002 Hook et al. ................. 379/279

(Continued)

FOREIGN PATENT DOCUMENTS

| JP | 2002-198974 | 7/2002 |
| JP | 2003-060649 | 2/2003 |
| JP | 2004-297172 | 10/2004 |

OTHER PUBLICATIONS

Shin et al., "A New Training Symbol Structure to Enhance the Performance of Channel Estimation for MIMO-OFDM Systems," IEEE International Conference on Acoustics, Speech, and Signal Processing Proceedings (ICASSP), vol. 1 of 6 pgs. IV397-IV400 (Apr. 6, 2003).
Sun et al., "Training Sequence Assisted Channel Estimation for MIMO OFDM," Wireless Communications and Networking, pp. 38-43 (Mar. 16, 2003).

*Primary Examiner*—Kwang B Yao
*Assistant Examiner*—Candal Elpenord
(74) *Attorney, Agent, or Firm*—Ryan, Mason & Lewis, LLP

(57) ABSTRACT

A method and apparatus are disclosed for transmitting symbols in a multiple antenna communication system according to a frame structure, such that the symbols can be interpreted by a lower order receiver (i.e., a receiver having a fewer number of antennas than the transmitter). The disclosed frame structure comprises a legacy preamble having at least one long training symbol and N-1 additional long training symbols that are transmitted on each of N transmit antennas. The legacy preamble may be, for example, an 802.11 a/g preamble that includes at least one short training symbol, at least one long training symbol and at least one SIGNAL field. A sequence of each of the long training symbols on each of the N transmit antennas are time orthogonal. The long training symbols can be time orthogonal by introducing a phase shift to each of long training symbols relative to one another.

25 Claims, 4 Drawing Sheets

U.S. PATENT DOCUMENTS

| | | | |
|---|---|---|---|
| 7,065,156 B1* | 6/2006 | Kuchi | 375/299 |
| 7,103,115 B2* | 9/2006 | Li | 375/340 |
| 7,203,245 B1* | 4/2007 | Murphy | 375/260 |
| 7,269,127 B2* | 9/2007 | Mody et al. | 370/210 |
| 7,272,108 B2* | 9/2007 | Li et al. | 370/203 |
| 7,280,621 B1* | 10/2007 | Murphy | 375/340 |
| 7,352,688 B1* | 4/2008 | Perahia et al. | 370/206 |
| 7,453,793 B1* | 11/2008 | Jones et al. | 370/203 |
| 2002/0193146 A1* | 12/2002 | Wallace et al. | 455/562 |
| 2003/0002471 A1* | 1/2003 | Crawford et al. | 370/343 |
| 2003/0016621 A1* | 1/2003 | Li | 370/203 |
| 2003/0072255 A1* | 4/2003 | Ma et al. | 370/208 |
| 2003/0076777 A1* | 4/2003 | Stuber et al. | 370/206 |
| 2004/0022174 A1* | 2/2004 | Li et al. | 370/203 |
| 2004/0081131 A1* | 4/2004 | Walton et al. | 370/344 |
| 2004/0121730 A1* | 6/2004 | Kadous et al. | 455/13.3 |
| 2004/0208115 A1* | 10/2004 | Liu et al. | 370/208 |
| 2004/0258025 A1* | 12/2004 | Li et al. | 370/334 |
| 2005/0141407 A1* | 6/2005 | Sandhu | 370/203 |
| 2005/0233709 A1* | 10/2005 | Gardner et al. | 455/101 |

* cited by examiner $$t_l = [01-1-111-11-11-1-1-1-1-111-1-11-11-111110\cdots$$
$$\cdots 011-1-111-11-1111111-1-111-11-11111]$$

METHODS AND APPARATUS FOR BACKWARDS COMPATIBLE COMMUNICATION IN A MULTIPLE ANTENNA COMMUNICATION SYSTEM USING TIME ORTHOGONAL SYMBOLS

CROSS REFERENCE TO RELATED APPLICATIONS

This application claims the benefit of U.S. Provisional Application No. 60/483,719, filed Jun. 30, 2003, and U.S. Provisional Application No. 60/528,169, filed Dec. 9, 2003, each incorporated by reference herein. The present application is also related to U.S. patent application Ser. No. 10/562,618, entitled "Method and Apparatus for Communicating Symbols in a Multiple Input Multiple Output Communication System Using Interleaved Subcarriers Across a Plurality of Antennas," U.S. patent application Ser. No. 10/562,619, entitled "Methods and Apparatus for Backwards Compatible Communication in a Multiple Input Multiple Output Communication System with Lower Order Receivers," and U.S. patent application Ser. No. 10/562,617, entitled "Methods and Apparatus for Backwards Compatible Communication in a Multiple Antenna Communication System Using FDM-Based Preamble Structures," each filed contemporaneously herewith and incorporated by reference herein.

FIELD OF THE INVENTION

The present invention relates generally to wireless communication systems, and more particularly, to frame structures that allow channel estimation for a multiple antenna communication system.

BACKGROUND OF THE INVENTION

Most existing Wireless Local Area Network (WLAN) systems based upon OFDM modulation comply with either the IEEE 802.11a or IEEE 802.11g standards (hereinafter "IEEE 802.11a/g"). See, e.g., IEEE Std 802.11a-1999, "Part 11: Wireless LAN Medium Access Control (MAC) and Physical Layer (PHY) Specification: High-Speed Physical Layer in the Five GHz Band," incorporated by reference herein. In order to support evolving applications, such as multiple high-definition television channels, WLAN systems must be able to support ever increasing data rates. Accordingly, next generation WLAN systems should provide increased robustness and capacity.

Multiple transmit and receive antennas have been proposed to provide both increased robustness and capacity. The increased robustness can be achieved through techniques that exploit the spatial diversity and additional gain introduced in a system with multiple antennas. The increased capacity can be achieved in multipath fading environments with bandwidth efficient Multiple Input Multiple Output (MIMO) techniques.

A MIMO-OFDM system transmits separate data streams on multiple transmit antennas, and each receiver receives a combination of these data streams on multiple receive antennas. The difficulty, however, is in distinguishing between and properly receiving the different data streams at the receiver. A variety of MIMO-OFDM decoding techniques are known, but they generally rely on the availability of accurate channel estimations. For a detailed discussion of MIMO-OFDM decoding techniques, see, for example, P. W. Wolniansky at al., "V-Blast: An Architecture for Realizing Very High Data Rates Over the Rich-Scattering Wireless Channel," 1998 URSI International Symposium on Signals, Systems, and Electronics (September 1998), incorporated by reference herein.

In order to properly receive the different data streams, MIMO-OFDM receivers must acquire a channel matrix through training. This is generally achieved by using a specific training symbol, or preamble, to perform synchronization and channel estimation techniques. The training symbol increases the total overhead of the system. In addition, a MIMO-OFDM system needs to estimate a total of $N_t N_r$ channel elements, where $N_t$ is the number of transmitters and $N_r$ is the number of receivers, which could lead to an $N_t$ increase of the long training length.

A need therefore exists for a method and system for performing channel estimation and training in a MIMO-OFDM system utilizing a signal that is orthogonal in either the frequency domain or the time domain. A further need exists for a method and system for performing channel estimation and training in a MIMO-OFDM system that is compatible with current IEEE 802.11a/g standard (SISO) systems, allowing MIMO-OFDM based WLAN systems to efficiently co-exist with SISO systems.

SUMMARY OF THE INVENTION

Generally, a method and apparatus are disclosed for transmitting symbols in a multiple antenna communication system according to a frame structure, such that the symbols can be interpreted by a lower order receiver (i.e., a receiver having a fewer number of antennas than the transmitter). The disclosed frame structure comprises a legacy preamble having at least one long training symbol and N-1 additional long training symbols that are transmitted on each of N transmit antennas. The legacy preamble may be, for example, an 802.11 a/g preamble that includes at least one short training symbol, at least one long training symbol and at least one SIGNAL field.

According to one aspect of the invention, a sequence of each of the long training symbols on each of the N transmit antennas are time orthogonal. The long training symbols can be time orthogonal by introducing a phase shift to each of long training symbols relative to one another. In this manner, a transmitter in accordance with the present invention may be backwards compatible with a lower order receiver and a lower order receiver can interpret the transmitted symbols and defer for an appropriate duration.

A more complete understanding of the present invention, as well as further features and advantages of the present invention, will be obtained by reference to the following detailed description and drawings.

DETAILED DESCRIPTION

Figures 1, 2:
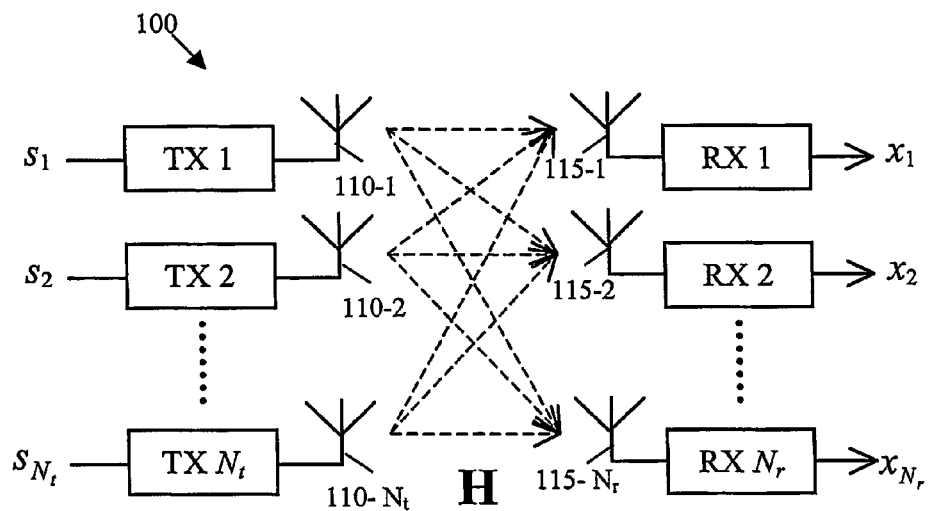
FIG. 1 illustrates a conventional multiple antenna communication system consisting of $N_t$ transmitters, $N_r$ receivers.
FIG. 2 illustrates a conventional long training symbol according to the IEEE 802.11 a/g standard consisting of 64 subcarriers, seen at the input of the Inverse Fast Fourier Transform (IFFT)

The present invention is directed to a backwards compatible MIMO-OFDM system. FIG. 1 illustrates an exemplary MIMO-OFDM system 100 comprising source signals $S_1$ to $S_{N_t}$, transmitters $TRANSMIT_1$ to $TRANSMIT_{N_t}$, transmit antennas 110-1 through 110-$N_t$, receive antennas 115-1 through 115-$N_r$, and receivers $RX_1$ to $RX_{N_r}$. The MIMO-OFDM system 100 transmits separate data streams on the multiple transmit antennas 110, and each receiver RX receives a combination of these data streams. In order to extract and detect the different data streams $S_1$ to $S_{N_t}$, the MIMO-OFDM receivers RX must acquire the channel matrix, H, as shown in FIG. 1, through training.

Figure 3:
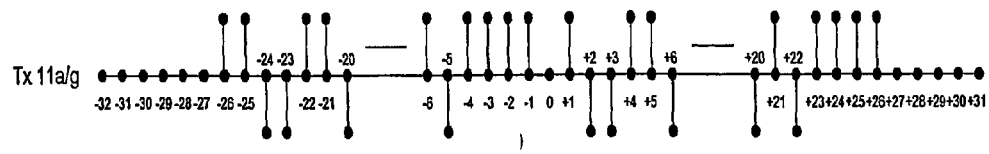
FIG. 3 illustrates a frequency domain representation of a conventional IEEE 802.11 a/g long training symbol.

The IEEE 802.11a/g standard specifies a preamble in the frequency domain for OFDM-based Wireless Local Area Network systems consisting of short and long training symbols. The short training symbols can be used for frame detection, Automatic Gain Control (AGC) and coarse synchronization. The long training symbols can be used for fine synchronization and channel estimation. The long training symbol according to the IEEE 802.11a/g standard consists of 64 subcarriers and is specified as shown in FIG. 2. FIG. 3 illustrates a frequency domain representation of the IEEE 802.11a/g long training symbol of FIG. 2.

The ideal training symbol for a MIMO-OFDM system is orthogonal in the frequency domain or in the time domain. According to one aspect of the present invention, the long training symbol of the IEEE 802.11a/g standard is made time orthogonal by phase shifting the various transmitted long training symbols for each transmit branch on the different transmit antennas.

Backwards Compatibility

A MIMO-OFDM system preferably needs to be backwards compatible to the current IEEE 802.11a/g standard in order to coexist with existing systems, since they will operate in the same shared wireless medium. The use of an IEEE 802.11a/g long training symbol in a MIMO-OFDM system as disclosed herein provides for a MIMO-OFDM system that is backwards compatible and that can coexist with IEEE 802.11a/g systems and MIMO-OFDM systems of other orders (i.e., comprising a different number of receivers/transmitters). As used herein, backwards compatibility means that a MIMO-OFDM system needs to be able to (i) support the current standards; and (ii) (optionally) defer (or standby) for the duration of a MIMO-OFDM transmission. Any system with $N_r$ receive antennas or another number of receive antennas that is not able to receive the data transmitted in a MIMO format is able to defer for the duration of the transmission since it is able to detect the start of the transmission and retrieve the length (duration) of this transmission, which is contained in the SIGNAL field following the long training symbols.

A MIMO-OFDM system 100 employing a long training symbol can communicate in a backwards-compatible way with an IEEE 802.11a/g system in two ways. First, it is possible to scale back to one antenna to transmit data according to the IEEE 802.11a/g standard. Secondly, the IEEE 802.11a/g receiver is able to interpret the MIMO transmission from all the active transmitters as a normal OFDM frame. In other words, an IEEE 802.11a/g receiver can interpret a MIMO transmission of data, in a manner that allows the IEEE 802.11a/g receiver to defer for the duration of the MIMO transmission. For a more detailed discussion of a suitable deferral mechanism, see, for example, U.S. patent application, entitled "Methods and Apparatus for Backwards Compatible Communication in a Multiple Input Multiple Output Communication System with Lower Order Receivers," incorporated by reference herein.

A MIMO system that uses at least one long training field of the IEEE 802.11a/g preamble structure repeated on different transmit antennas can scale back to a one-antenna configuration to achieve backwards compatibility. A number of variations are possible for making the long training symbols orthogonal. In one variation, the long training symbols can be diagonally loaded across the various transmit antennas, in the manner described above. In another variation, 802.11a long training sequences are repeated in time on each antenna. For example, in a two antenna implementation, a long training sequence, followed by a signal field is transmitted on the first antenna, followed by a long training sequence transmitted on the second antenna. A further variation employs FDM based MIMO-OFDM preamble structures based on orthogonality in the frequency domain.

According to one aspect of the present invention, a time orthogonal preamble structure is employed, whereby the 802.11a/g preamble is transmitted on each antenna at the same time followed by one or more additional training symbols. Time orthogonality is maintained by employing a phase shift to distinguish each of the additional training symbols. For example, in a two antenna implementation, discussed below in conjunction with FIG. 5, one additional training symbol is transmitted on each antenna, each with opposite polarity.

Figure 4:
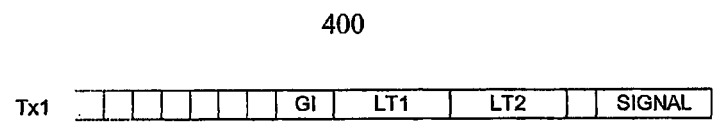
FIG. 4 illustrates a conventional IEEE 802.11a/g preamble structure.
Figure 5:
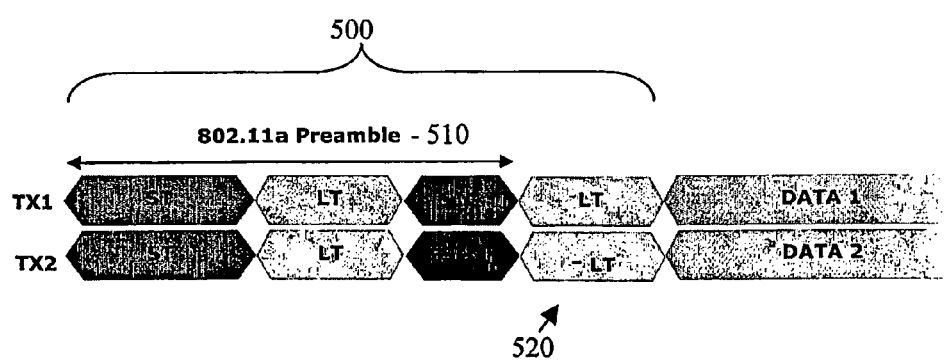
FIG. 5 illustrates a MIMO preamble with time-orthogonal long training symbols for two transmit branches in accordance with the present invention.

FIG. 4 illustrates a conventional IEEE 802.11a/g preamble structure 400 and FIG. 5 illustrates a MIMO-OFDM preamble structure 500 incorporating features of the present invention. As shown in FIG. 4, LT1 and LT2 are the long training symbols, respectively, and SIGNAL is the SIGNAL-field. The 802.11a/g preamble would be followed by data. For MIMO devices, it is necessary to have a long training symbol available for each transmit antenna. Hence, a need exists for a MIMO preamble and SIGNAL field that is backwards compatible with 802.11a/g and in the mean time provide channel information of each transmit antenna, i.e., the sequence of training symbols transmitted on one transmitter branch needs to be orthogonal to the sequences transmitted on the other branches.

FIG. 5 illustrates a MIMO preamble 500 with time-orthogonal long training symbols, that are compatibe with legacy devices in accordance with the present invention. The exemplary MIMO preamble 500 shown in FIG. 5 is for a 2×M MIMO implementation, with two transmit antennas and M (also referred to herein as $N_r$) receive antennas (which is outside the scope of the present invention). The MIMO preamble 500 maintains the legacy preamble 510 intact by transmitting the legacy preamble 510 at both transmit antennas simultaneously. After the 802.11a/g preamble 510, one or more additional training symbols 520 provided by the present invention are transmitted.

In the implementation shown in FIG. 5, the new training symbols 520 are identical to the IEEE 802.11a long training symbols (i.e., 1.6 microsecond guard space and two times 3.2 microsecond IEEE long training data) except for the polarity of the additional long training symbol on one transmit antenna. The second transmit antenna transmits the second long training symbol with reversed polarity, i.e., multiplied by −1. Thus, for the additional long training sequences 520, anti-podal, simultaneous transmission of the long training field is employed at for TX1 and TX2.

Digital processing techniques are employed to obtain the channel transfer function for each transmit antenna at each of the M receivers. Furthermore, the MIMO preamble 500 enables frequency synchronization and symbol timing.

The training sequence sent out denoted as $LT_i^{TXn}$ where TXn indicates the nth transmit antenna and where i is the discrete time indicator ($i^{th}$ long training symbol transmitted). Assume that the long training symbol is identical to the 802.11a/g long training sequence of FIG. 3. Then, the training sequences transmitted at each antenna are:

$$LT_1^{TX1}=LT; LT_2^{TX1}=LT$$

$$LT_1^{TX2}=LT; LT_2^{TX2}=-LT$$

Let the $i^{th}$ set of received long training symbols for a receiver m be called $LT_i^{RXm}$. The long training symbol related to transmit antenna TXn and receive antenna RXm, called $LT_n^m$, is obtained by adding up and by subtracting, respectively, for it equal to 1 and 2, as follows:

$$LT_1^m=(LT_1^{RXm}+LT_2^{RXm})/2$$

$$LT_2^m=(LT_1^{RXm}-LT_2^{RXm})/2$$

From the symbol $LT_n^m$, the channel coefficients can be estimated using the techniques applied for systems based on the 802.11a/g standard.

Extension to N Transmit Antennas

Figure 6:
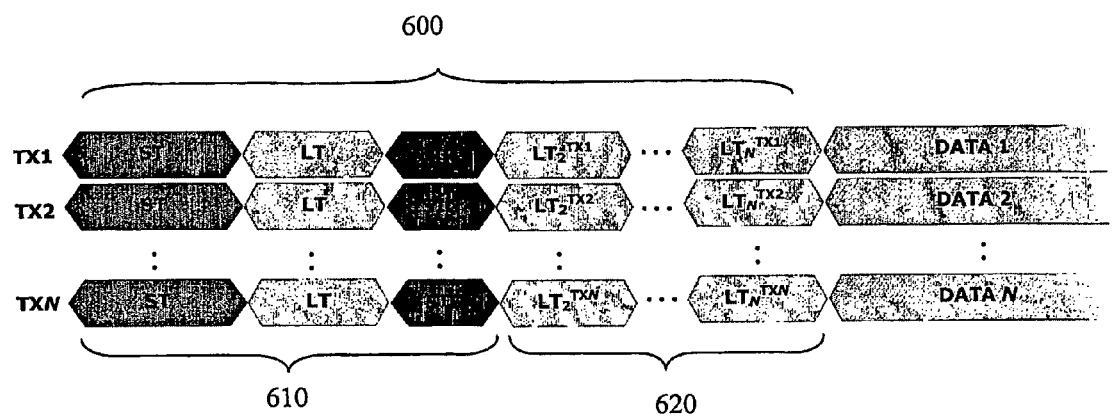
FIG. 6 illustrates a MIMO preamble for N transmit branches with time-orthogonal long training symbols in accordance with the present invention.

The two antenna backwards compatible MIMO preamble 500 of FIG. 5 can be extended to a system with N transmit antennas (also referred to herein as $N_t$) and M receive antennas (also referred to herein as $N_r$). FIG. 6 illustrates a MIMO preamble 600 for N transmit branches with time-orthogonal long training symbols that are compatibe with legacy devices in accordance with the present invention. As shown in FIG. 6, the MIMO preamble 600 extends the MIMO preamble 500 of FIG. 5 to include a total of N long training symbols on each transmit branch. The MIMO preamble 600 maintains the legacy preamble 610 intact by transmitting the legacy; preamble 610 on each transmit antenna simultaneously. After the 802.11a/g preamble 610, N-1 additional training symbols 620 provided by the present invention are transmitted on each transmit antenna.

According to one aspect of the present invention, the N long training symbols transmitted on each transmit branch are distinguished by a phase shift, as discussed hereinafter, to make the N long training symbols orthogonal in time. The sequence of long training symbols on a given transmit branch are thus orthogonal to the sequence of long training symbols on the other transmit branches.

Using the same notation as employed above for the 2×M system, the transmitted preamble is given by:

$$LT_1^{TX1} = LT; LT_2^{TX1} = LT; \ldots ; LT_N^{TX1} = LT,$$

$$LT_1^{TX2} = LT; LT_2^{TX2} = \exp(j^*(2\pi/N)^*1^*1)^*LT; \ldots ; LT_N^{TX2} = \exp(j^*(2\pi/N)^*1^*(N-1))^*LT$$
$$\vdots \quad ; \quad \vdots \quad ; \quad \ldots \quad ; \quad \vdots$$
$$LT_1^{TXN} = LT; LT_2^{TXN} = \exp(j^*(2\pi/N)^*(N-1)^*1)^*LT; \ldots ; LT_N^{TXN} = \exp(j^*(2\pi/N)^*(N-1)^*(N-1))^*LT$$

The $i^{th}$ set of received long training symbols for a receiver m are denoted as $LT_i^{RXm}$. The LT related to transmit antenna TXn and receive antenna RXm, denoted $LT_n^m$, is obtained by:

$$LT_1^m = (LT_1^{RXm} + LT_2^{RXm} + \ldots + LT_N^{RXm})/N$$

$$LT_1^m = (LT_1^{RXm} + \exp(-j^*(2\pi/N)^*1^*1)^*LT_2^{RXm} + \ldots + \exp(-j^*(2\pi/N)^*1^*(N-1))^*(N-1))^*LT_n^{RXm})/N$$
$$\vdots \quad = \quad \vdots \quad + \ldots + \quad \vdots$$
$$LT_1^m = (LT_1^{RXm} + \exp(-j^*(2\pi/N)^*(N-1)^*1)^*LT_2^{RXm} + \ldots + \exp(-j^*(2\pi/N)^*(N-1)^*(N-1))^*LT_N^{RXm})/N$$

It is noted that the earlier described 2×M case is a special case of the preamble 600 and that, again, the channel coefficients can be estimated, in a similar way as in an 802.11a/g system, using $LT_n^m$.

For MIMO-OFDM devices based on 802.11a/g, it would be helpful to get an early indication of a MIMO transmission. The reserved bit (bit 4) in the SIGNAL field can be used for this purpose. Legacy devices should ignore this bit and TGn devices can set this bit when MIMO is transmitted and reset this bit in legacy modes. It is noted that IEEE 802.11a does not specify the value of the reserved bit, so legacy devices may set this bit. The MIMO receiver should be aware of that and should be able to return to legacy mode. IEEE 802.11g requires transmitters to reset this bit to the value "0", but also requires receivers to ignore this bit.

If the number of transmit antennas in a MIMO mode can dynamically vary within a service area (BSS or IBSS), and it is not determined by the access point to 1 or N (per Beacon), it would be helpful for the PHY to have an early indication of the number of antennas. A solution to this would be a field after the SIGNAL field that indicates the number of transmit antennas and the number of long training fields that follow. This could possibly be transmitted in a legacy 6 Mbps mode. Further, the field could contain information like various coding schemes, channel bonding options and long training format.

Figure 7:
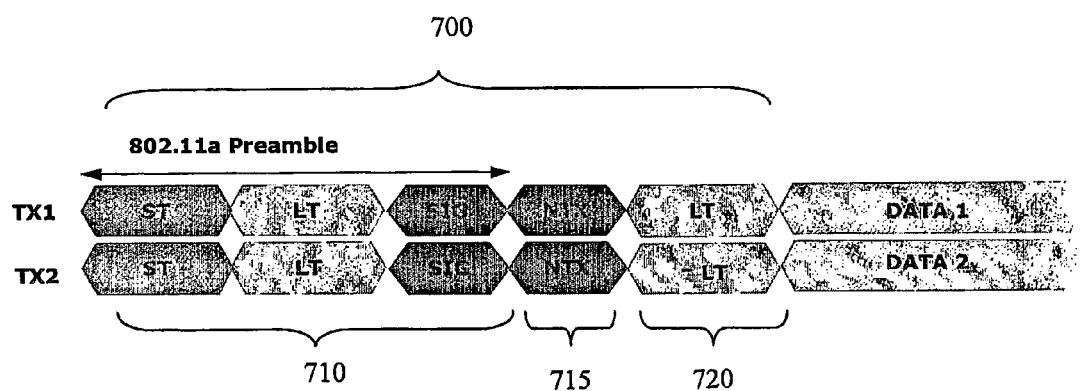
FIG. 7 illustrates an alternate MIMO preamble with time-orthogonal long training symbols for an implementation having two transmit branches.

FIG. 7 illustrates a MIMO preamble 700 for two exemplary transmit branches with time-orthogonal long training symbols that are compatibe with legacy devices in accordance with the present invention. As shown in FIG. 7, the MIMO preamble 700 extends the MIMO preamble 500 of FIG. 5 to include an additional field 715 (NTx) for specifying the number of transmit antennas. The MIMO preamble 700 maintains the legacy preamble 710 intact by transmitting the legacy preamble 710 on both transmit antenna simultaneously. After the 802.11a/g preamble 610, the additional field 715 (NTx) and one additional training symbol 720 provided by the present invention are transmitted on both transmit antennas.

The overhead associated with the techniques of the present invention consists of the relatively long training compared to the payload. It is noted that for a fixed maximum packet size, the DATA part becomes shorter with MIMO while the training gets proportionally longer. Hence, the ratio gets worse quadratically. A solution to prevent this is using shorter long training fields. Long training fields typically have a guard interval and two long training symbols, a total of 8 microseconds. Although performance will be better with the same double long training symbols for MIMO training, it would be sufficient to have a single long training symbol. Furthermore, and optionally, a smaller guard interval can be applied, e.g. the guard interval for normal OFDM symbols being 0.8 microseconds instead of 1.6 microseconds. Both features may be optional and be indicated in the additional field 715, as described above.

Figure 8:
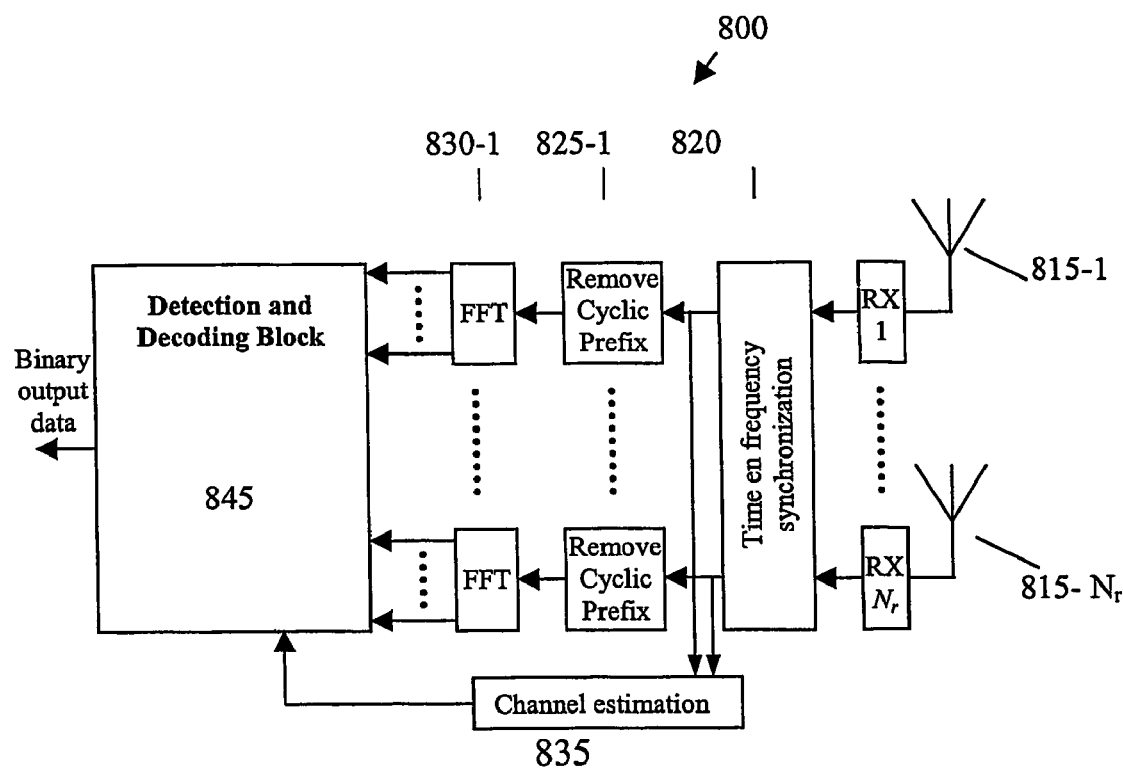
FIG. 8 is a block diagram of an exemplary MIMO-OFDM receiver in accordance with the present invention.

FIG. 8 is a block diagram of an exemplary MIMO-OFDM receiver 800 incorporating features of the present invention. As shown in FIG. 8, the MIMO-OFDM receiver 800 includes a plurality of receive antennas 815-1 through 815-$N_r$, and receivers $RX_1$ to $RX_{N_r}$. Time and frequency synchronization is performed at stage 820, and the synchronized received signal is applied to stage 825 that removes the cyclic prefix and a channel estimation stage 835. Once the cyclic prefix is removed at stage 825, a fast fourier transform (FFT) is performed at stage 830. A detection and decoding block 845 performs MIMO detection (for $N_c$ subcarriers), phase drift and amplitude droop correction, demapping, deinterleaving, depuncturing and decoding, using the channel estimate 835.

The MIMO-OFDM receiver 800 can perform channel estimation 835 with training symbols and detection of the SIGNAL-field as follows:

1. add the two long training symbols LT received before SIGNAL field to gain in SNR;
2. transform the resulting long training symbol to the frequency domain;
3. demodulate the long training symbol, resulting in an estimate of the sum of the channel elements from all transmit antennas to the regarded receive antenna.
4. transform the SIGNAL-field to the frequency domain;
5. detect and decode the SIGNAL-field (and NTX field if available) using the estimate of the sum of the channel estimates;
6. If this indicates the packet is detectable for the receiver (enough number of receive antennas), proceed with the channel estimation as explained before, otherwise defer for the length of the packet.

It is to be understood that the embodiments and variations shown and described herein are merely illustrative of the principles of this invention and that various modifications may be implemented by those skilled in the art without departing from the scope and spirit of the invention.

We claim:

1. A method for transmitting data in a multiple antenna communication system having N transmit antennas, said method comprising the step of:
   transmitting a legacy preamble and at least one additional long training symbol on each of said N transmit antennas, wherein said legacy preamble comprises at least one long training symbol, wherein a sequence of each of said long training symbols on each of said N transmit antennas are orthogonal, and wherein each of said long training symbols are time orthogonal by introducing a phase shift between at least two of said training symbols transmitted on one of said N transmit antennas.

2. The method of claim 1, wherein said legacy preamble further comprises at least one short training symbol.

3. The method of claim 1, wherein said legacy preamble further comprises at least one SIGNAL field.

4. The method of claim 1, wherein said legacy preamble is an 802.11 a/g preamble.

5. The method of claim 1 , wherein said phase shift is introduced to each of said long training symbols using a complex rotation.

6. The method of claim 1, wherein N is two and wherein said transmitting step further comprises the step of transmitting a legacy preamble having at least one long training symbol and one additional long training symbol on each of said two transmit antennas, wherein one of said transmit antennas transmits one of said long training symbols with a reversed polarity.

7. The method of claim 1, whereby a lower order receiver can interpret said transmitted data.

8. The method of claim 1, further comprising the step of transmitting a field indicating said number N of transmit antennas.

9. The method of claim 1, further comprising the step of transmitting a field identifying an employed coding scheme.

10. The method of claim 1, further comprising the step of transmitting a field identifying channel bonding options.

11. The method of claim 1, further comprising the step of transmitting a field identifying a long training symbol format.

12. The method of claim 1, wherein said legacy preamble has a shorter guard interval.

13. The method of claim 1, wherein said legacy preamble has a long training field containing only one long training symbol.

14. A transmitter in a multiple antenna communication system, comprising:

a transmitter circuit; and

N transmit antennas for transmitting a legacy preamble and at least one additional long training symbol on each of said N transmit antennas, wherein said legacy preamble comprises at least one long training symbol, wherein each of said long training symbols are orthogonal, and wherein each of said long training symbols are time orthogonal by introducing a phase shift between at least two of said training symbols transmitted on one of said N transmit antennas.

15. The transmitter of claim 14, wherein said legacy preamble further comprises at least one short training symbol.

16. The transmitter of claim 14. wherein said legacy preamble further comprises at least one SIGNAL field.

17. The transmitter of claim 14, wherein said legacy preamble is an 802.11 a/g preamble.

18. The transmitter of claim 14, wherein each of said time orthogonal long training symbols are stored in memory and said phase shift is introduced when said long training symbols are transmitted.

19. The transmitter of claim 14, wherein N is two and wherein said transmitting step further comprises the step of transmitting a legacy preamble having at least one long training symbol and one additional long training symbol on each of said two transmit antennas, wherein one of said transmit antennas transmits one of said long training symbols with a reversed polarity.

20. The transmitter of claim 14, whereby a lower order receiver can interpret said transmitted data.

21. The transmitter of claim 14, further comprising the step of transmitting a field indicating said number N of transmit antennas.

22. A method for receiving data on at least one receive antenna transmitted by a transmitter having N transmit antennas in a multiple antenna communication system, said method comprising the steps of:

receiving a legacy preamble and at least one additional long training symbol on each of said N transmit antennas, wherein said legacy preamble comprises at least one long training symbol and an indication of a duration of a transmission of said data, wherein a sequence of each of said long training symbols on each of said N transmit antennas are orthogonal, said legacy preamble transmitted such that said indication of a duration is capable of being interpreted by a lower order receiver, and wherein each of said long training symbols are time orthogonal due to a phase shift that was introduced between at least two of said training symbols transmitted on one of said N transmit antennas; and deferring for said indicated duration.

23. The method of claim 22, wherein said method is performed by a SISO receiver.

24. The method of claim 22, wherein said indication is transmitted in a SIGNAL field that complies with the 802.11 a/g standards.

25. A receiver in a multiple antenna communication system having at least one transmitter having N transmit antennas, comprising:

a receiver circuit; and at least one receive antenna for receiving a legacy preamble and at least one additional long training symbol on each of said N transmit antennas, wherein said legacy preamble comprises at least one long training symbol and an indication of a duration of a transmission of said data, wherein a sequence of each of said long training symbols on each of said N transmit antennas are orthogonal, said legacy preamble transmitted such that said indication of a duration is capable of being interpreted by a lower order receiver, and wherein each of said long training symbols are time orthogonal due to a phase shift that was introduced between at least two of said training symbols transmitted on one of said N transmit antennas; and means for deferring for said indicated duration.

* * * * *

UNITED STATES PATENT AND TRADEMARK OFFICE
CERTIFICATE OF CORRECTION

PATENT NO.       : 7,885,177 B2
APPLICATION NO.  : 10/562620
DATED            : February 8, 2011
INVENTOR(S)      : Robert John Kopmeiners It is certified that error appears in the above-identified patent and that said Letters Patent is hereby corrected as shown below:

In column 5 and 6, line 62, " $LT_1^{n=}$ " should be replaced by -- $LT_2^{n} =$ --.

In column 5 and 6, line 64, " $LT_1^{n=}$ " should be replaced by -- $LT_N^{m}$ --.

Signed and Sealed this
Eighteenth Day of December, 2012

David J. Kappos
*Director of the United States Patent and Trademark Office*